(12) United States Patent
Horn et al.

(10) Patent No.: US 11,297,940 B2
(45) Date of Patent: Apr. 12, 2022

(54) OFFICE WORKPLACE SYSTEM

(71) Applicant: DATAFLEX INTERNATIONAL B.V., Krimpen a/d Ussel (NL)

(72) Inventors: Tijs Pieter Horn, Krimpen a/d Ussel (NL); Roderik Johan Mos, Krimpen a/d Ussel (NL)

(73) Assignee: DATAFLEX INTERNATIONAL B.V., Rimpen A/D Ijssel (NL)

( * ) Notice: Subject to any disclaimer, the term of this patent is extended or adjusted under 35 U.S.C. 154(b) by 145 days.

(21) Appl. No.: 16/342,235

(22) PCT Filed: Oct. 13, 2017

(86) PCT No.: PCT/EP2017/076151
§ 371 (c)(1),
(2) Date: Apr. 16, 2019

(87) PCT Pub. No.: WO2018/073108
PCT Pub. Date: Apr. 26, 2018

(65) Prior Publication Data
US 2019/0246790 A1    Aug. 15, 2019

(30) Foreign Application Priority Data

Oct. 18, 2016   (NL) .................................. 2017632

(51) Int. Cl.
*A47B 21/04*   (2006.01)
*A47G 5/00*    (2006.01)
(Continued)

(52) U.S. Cl.
CPC .............. *A47B 21/04* (2013.01); *A47B 21/02* (2013.01); *A47B 83/001* (2013.01); *A47B 97/00* (2013.01);
(Continued)

(58) Field of Classification Search
CPC ....... A47B 21/04; A47B 21/02; A47B 83/001; A47B 97/00; A47B 2200/0084;
(Continued)

(56) References Cited

U.S. PATENT DOCUMENTS

| 1,992,903 | A | * | 2/1935 | Potashnik | ............... | A47B 83/02 |
| | | | | | | 297/158.1 |
| 2,944,861 | A | * | 7/1960 | Lessin | .................... | A47B 17/02 |
| | | | | | | 312/196 |

(Continued)

FOREIGN PATENT DOCUMENTS

| EP | 1364596 A1 | 11/2003 |
| EP | 1806068 A1 | 7/2007 |

OTHER PUBLICATIONS

International Search Report and Written Opinion for the International Patent Application No. PCT/EP2017/076151, dated Dec. 14, 2017, 12 pages.

*Primary Examiner* — Nkeisha Smith
(74) *Attorney, Agent, or Firm* — Kacvinsky Daisak Bluni PLLC

(57) ABSTRACT

An office workplace system includes a vertically extending frame with a base to be placed on, or fixed to, a floor, a wall, a ceiling or a desk top; and a sound reducing and/or absorbing screen. The screen is elongated, the front surface of the screen and the short edges of the screen extend vertically and the long edges of the screen extend horizontally. The frame can hold the screen at a height relative to the floor, the wall, the ceiling or the desk top. The height of the frame is adjustable relative to its base. The lower edge of the screen can extend higher than the height of the top front surface of an office desk with which the system is used. A computer display mount for holding at least one computer display. The frame holds the display mount at a height relative to the floor, the wall, the ceiling or the desk top. The (Continued)

frame can hold the display mount at a height relative to the base of the frame. The system can fix the relative height between the screen and the display mount while the height of the screen and the display is being adjusted.

19 Claims, 7 Drawing Sheets

(51) Int. Cl.
  *A47B 83/00* (2006.01)
  *E04B 2/74* (2006.01)
  *F16M 11/04* (2006.01)
  *A47B 97/00* (2006.01)
  *A47B 21/02* (2006.01)

(52) U.S. Cl.
  CPC .............. *A47G 5/00* (2013.01); *E04B 2/74* (2013.01); *F16M 11/04* (2013.01); *A47B 2200/0084* (2013.01); *A47B 2200/0085* (2013.01); *A47B 2200/01* (2013.01); *A47B 2200/12* (2013.01)

(58) Field of Classification Search
  CPC ........ A47B 2200/0085; A47B 2200/01; A47B 2200/12; A47G 5/00; E04B 2/74; F16M 11/04
  USPC .................................................. 248/176.3
  See application file for complete search history.

(56) References Cited

U.S. PATENT DOCUMENTS

| | | | | |
|---|---|---|---|---|
| 4,739,637 A * | 4/1988 | Finkel | ................. | E05B 73/0082 248/553 |
| 4,832,419 A * | 5/1989 | Mitchell | ............... | G06F 1/1615 248/918 |
| 5,024,030 A * | 6/1991 | Morrison | ............. | A47B 83/001 52/36.1 |
| 6,229,693 B1 * | 5/2001 | Karidis | ................. | G06F 1/1616 361/679.05 |
| 6,654,235 B2 * | 11/2003 | Imsand | ..................... | G06F 1/16 150/165 |
| 7,180,731 B2 * | 2/2007 | Titzler | .................. | G06F 1/1601 361/679.22 |
| 7,789,025 B2 * | 9/2010 | Michaud, II | ........... | A47B 17/02 108/60 |
| 8,051,782 B2 * | 11/2011 | Nethken | ................. | A47B 21/03 108/50.01 |
| 8,235,335 B2 * | 8/2012 | Sato | ..................... | G02F 1/13336 248/176.3 |
| 8,662,605 B2 * | 3/2014 | McRorie | ................. | A61B 50/13 312/276 |
| 8,804,321 B2 * | 8/2014 | Kincaid | ................... | A47B 9/20 361/679.21 |
| 9,169,960 B2 * | 10/2015 | Hakansson | .......... | F16M 11/046 |
| 9,204,723 B2 * | 12/2015 | Floersch | ................ | F16M 11/04 |
| 9,414,697 B2 * | 8/2016 | Parshad | ................... | A47G 5/00 |
| 9,560,913 B2 * | 2/2017 | Scharing | ............... | A47B 81/062 |
| 9,615,681 B2 * | 4/2017 | Goranson | ............... | E04B 2/7427 |
| 9,791,093 B2 * | 10/2017 | Aoyagi | ................... | F16D 59/02 |
| 9,861,192 B2 * | 1/2018 | Wu | ........................ | A47B 21/02 |
| 9,918,550 B1 * | 3/2018 | Taylor | ................... | G06F 3/1431 |
| 9,979,837 B2 * | 5/2018 | Badeau | ............... | H04M 1/0295 |
| 10,226,124 B2 * | 3/2019 | Ahn | ........................ | H04N 5/655 |
| 10,322,764 B2 * | 6/2019 | Thomas | ..................... | B62J 9/21 |
| 10,376,042 B1 * | 8/2019 | Johnson | ................. | A47B 21/06 |
| 2009/0133609 A1 | 5/2009 | Nethken et al. | | |
| 2010/0302454 A1 * | 12/2010 | Epstein | .................. | H04N 5/268 348/705 |
| 2015/0001355 A1 * | 1/2015 | Huang | ................... | F16M 11/42 248/123.11 |
| 2015/0308608 A1 * | 10/2015 | Lei | ......................... | F16M 11/10 361/679.01 |
| 2015/0320202 A1 * | 11/2015 | Hazzard | ............. | A47B 21/0314 248/447.1 |
| 2017/0051865 A1 * | 2/2017 | Chen | .................... | F16M 11/046 |
| 2017/0055697 A1 * | 3/2017 | Kincaid | ............... | H05K 5/0017 |
| 2017/0159873 A1 * | 6/2017 | Farrell | ................. | F16M 13/022 |
| 2017/0202351 A1 * | 7/2017 | Bowman | ............. | F16M 11/2014 |
| 2018/0168334 A1 * | 6/2018 | Swartz | ................. | F16M 13/00 |
| 2018/0310705 A1 * | 11/2018 | Game | ................ | A47B 21/0314 |
| 2019/0346080 A1 * | 11/2019 | Wang | ................... | F16M 11/046 |
| 2020/0347986 A1 * | 11/2020 | Xiang | ................... | F16M 11/046 |

* cited by examiner

OFFICE WORKPLACE SYSTEM

This is a national stage application filed under 35 U.S.C. § 371 of pending international application PCT/EP2017/076151 filed Oct. 13, 2017, which claims priority to Netherlands patent application NL 2017632, filed Oct. 18, 2016, the entirety of which applications are hereby incorporated by reference herein.

The invention relates to an office workplace system, intended to be used together with an office desk, comprising a sound reducing and/or absorbing screen.

Sound reducing and/or absorbing screens are described in for instance WO 2014/143861 A1. Such screens are placed around the back and/or sides of an office desk, on which further a computer display and keyboard are usually present, in order to provide privacy and sound reduction in an office environment. Several ergonomic issues play an important role in the workplace, such as sound (including noise), the visual work environment, privacy, the physical working position, and the readability of the display in view of glare. The invention aims at improving one or more of these conditions.

To that end the system comprises a vertically extending frame with a base arranged to be placed on, or fixed to, a floor, a wall, a ceiling or a desk top; a sound reducing and/or absorbing screen, wherein the screen is elongated in shape, the front surface of the screen and the short edges of the screen extend vertically and the long edges of the screen extend horizontally; wherein the frame is arranged to hold the screen at a height relative to the floor, the wall, the ceiling or the desk top; wherein the frame is provided with means to adjust the height of the screen relative to the base of the frame; and wherein the system is dimensioned such that the lower edge of the screen is allowed to extend higher than the height of the top front surface of an office desk with which the system is used. Thereby the vertical dimension of the screen is allowed to be small, such that the user will not have the feeling of being locked away, but because it can be set at a desired height (typically users will set the centre to the height of the user's eyes and ears when sitting or standing at the desk) it will be effective for reducing sound.

In a preferred embodiment the system further comprises a computer display mount for holding at least one computer display; wherein the frame holds the display mount at a height relative to the floor, the wall, the ceiling or the desk top; wherein the frame is provided with means to adjust the height of the display mount relative to the base of the frame; and wherein the system is provided with means arranged to fix the relative height between the screen and the display mount while the height of the screen and the display is being adjusted. Thereby the display will automatically be moved up and down with the screen, to the ideal height where the display is more or less at the same height as the user's eyes when sitting or standing at the desk. This solves the problem that computer displays are usually set too low by users, which may result in a wrong physical working position. Preferably said means arranged to fix the relative height between the screen and the display mount are arranged to fix the display mount at or against the centre of front surface of the screen, such that the centre of the display mount is always at the same height as the centre of the screen front surface. Preferably said computer display mount is arranged to hold two computer displays horizontally next to each other. The computer display may be a separate device, but it may also be part of a laptop or a tablet, etc., and it may be a touchscreen.

Preferably said screen has a central part which is substantially flat and two lateral side wings of which the front surfaces face each other and extend approximately perpendicular to the front surface of the central part. Thereby the front side of the user will be more or less surrounded by the screen, and a computer display located between the wings will suffer less glare.

The horizontal cross sections of the connecting front surface between the side wings and the central part are preferably curved. The vertical cross sections of the front surface of the screen are preferably curved near the upper and lower edges. The front surface of the screen is for instance formed by a sound insulating and/or sound absorbing padding, such as a 5-30 mm thick padding, for instance made of polyether foam, optionally covered by a fabric. The frame may also be covered by such padding.

The system is preferably dimensioned such that the height of the centre of the screen can be adjusted to at least two different heights in the range of 20 cm and 60 cm above the top front surface of an office desk with which the system is used. If the base of the frame is arranged to be placed on a floor, the system is preferably dimensioned such that the lower edge of the screen is allowed to extend higher than 70 cm above the floor, if said base is placed on said floor. If the base of the frame is arranged to be placed on, or fixed to, a desk top, the system is preferably dimensioned such that the lower edge of the screen is allowed to extend higher than the top front surface of said desk top, if said base is placed on, or fixed to, said desk top. The distance between the front surfaces of the lateral side wings is preferably between 100 and 140 cm, such that for instance two computer displays of 24 inch can be placed horizontally next to each other between the wings. The height of the front surface of the screen is preferably between 30 cm and 60 cm.

The frame preferably comprises a vertically extending plate comprising one, two or more vertical slots in which the screen is slidably mounted. Said means to adjust the height of the screen relative to the base of the frame preferably comprise a spring or a counterweight which exerts an upward force to the screen which is at least equal to approximately the total weight of the height adjustable parts of the system including the screen.

The invention will now be illustrated by means of a preferred embodiment, with reference to the drawings, wherein.

Figure 1:
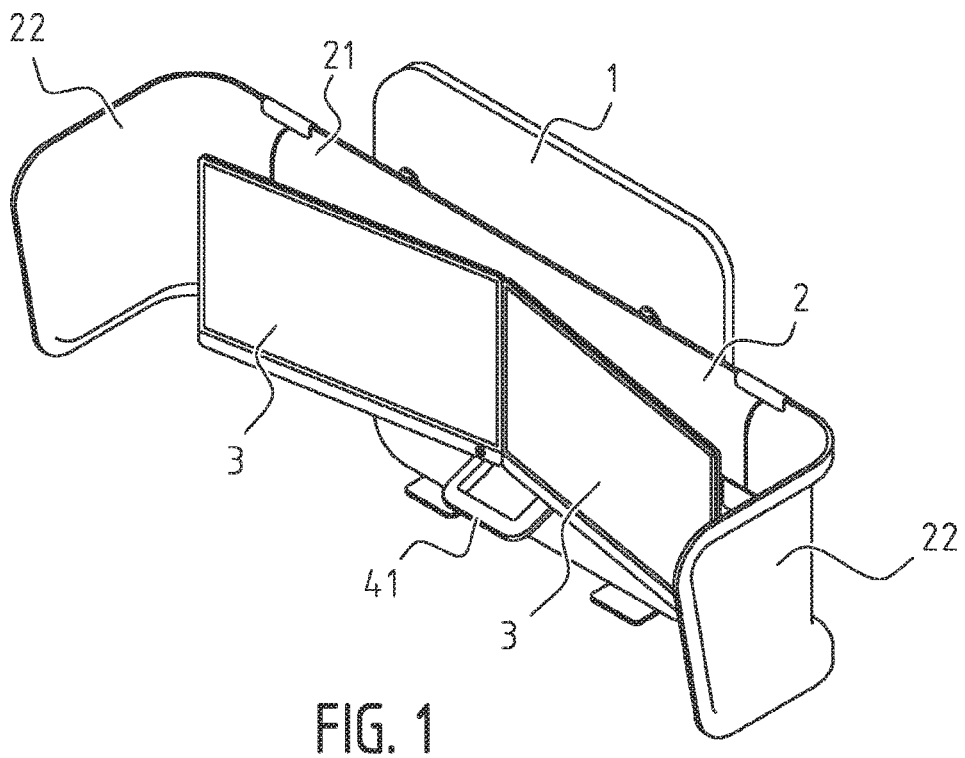
FIG. 1 is a perspective view of an office workplace system in accordance with the invention.
Figure 2:
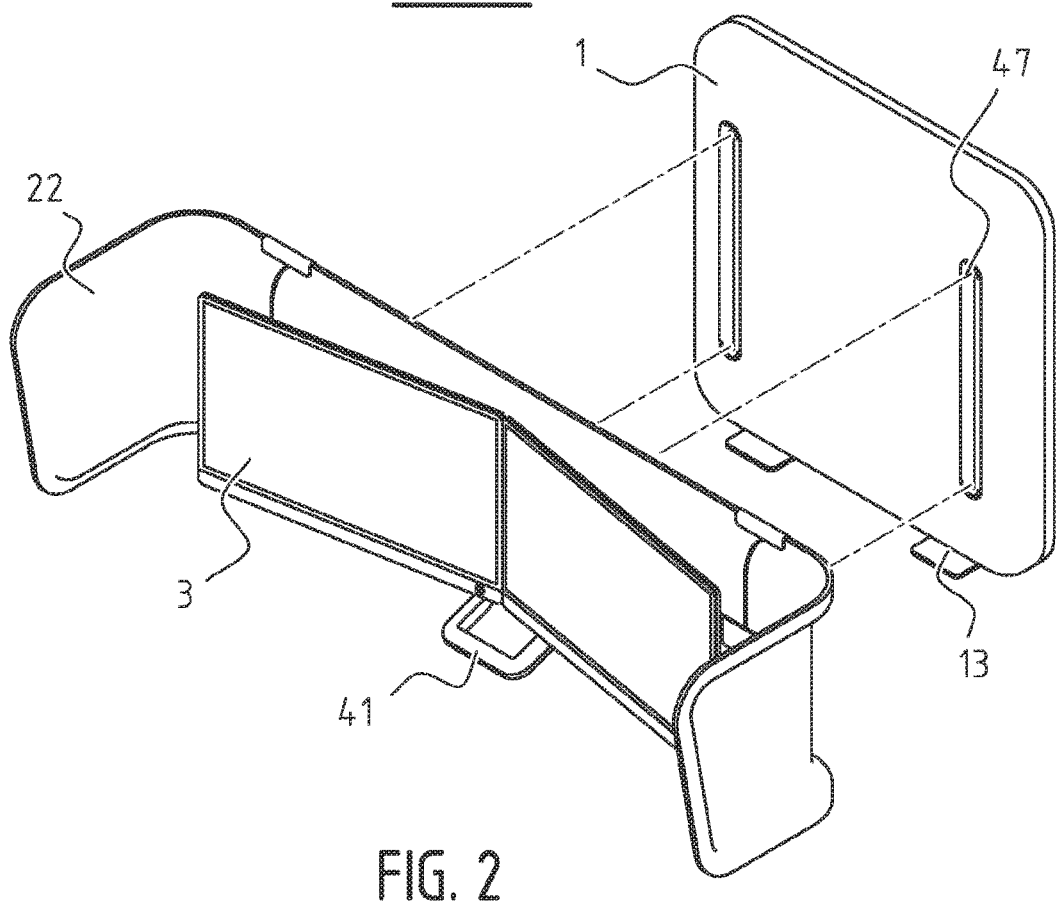
FIG. 2 is an exploded view of the system of FIG. 1.
Figure 3:
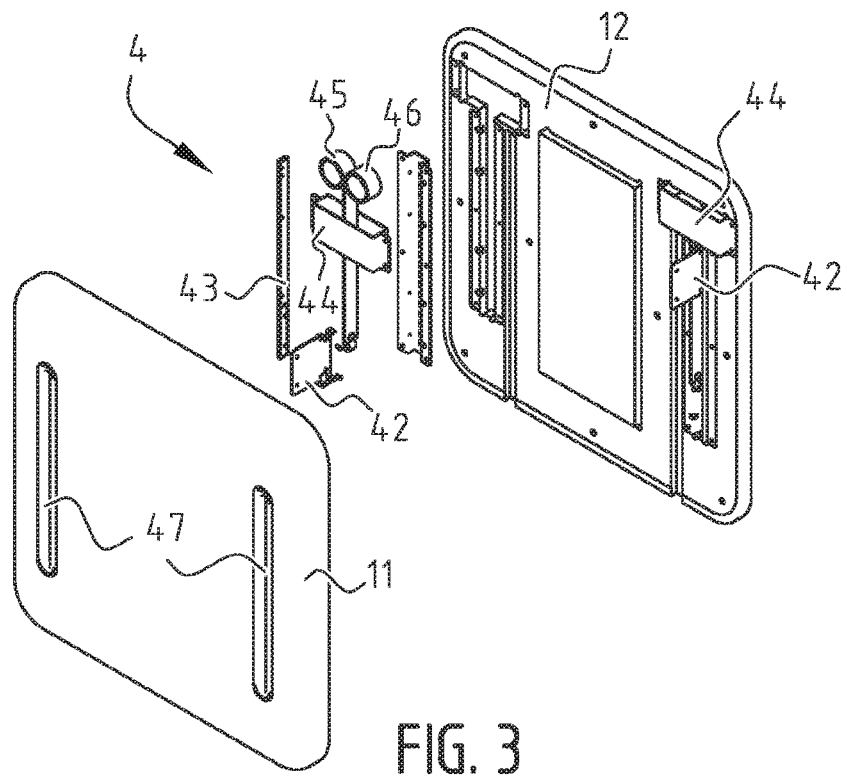
FIG. 3 is an exploded view of the height adjustment system of the system of FIG. 1.
Figure 4:
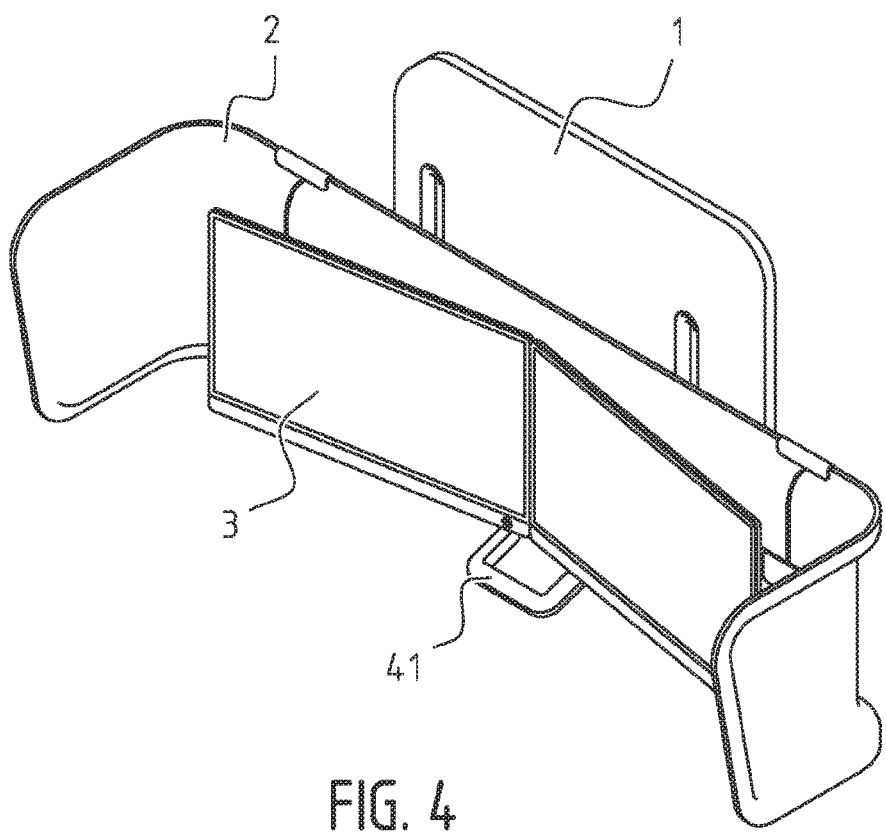
FIG. 4 is a perspective view of the system of FIG. 1 with the screen and computer displays in the lowest position.
Figure 5:
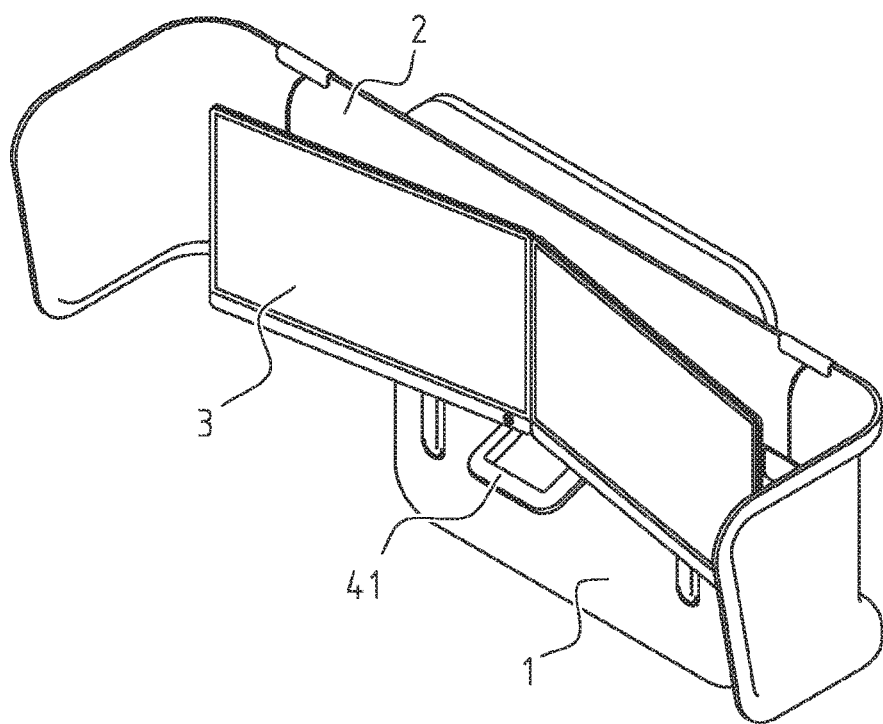
FIG. 5 is a perspective view of the system of FIG. 1 with the screen and computer displays in the highest position.
Figure 6C:
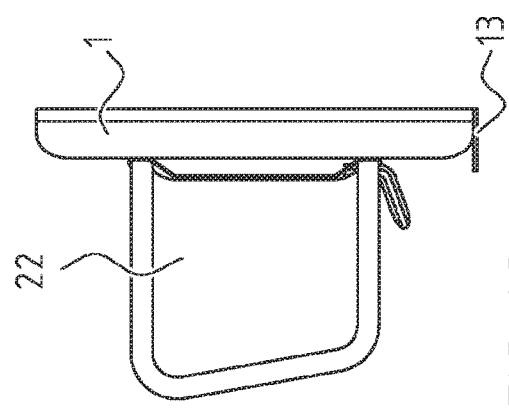
FIG. 6C is a side view of the system of FIG. 1.
Figure 6A:
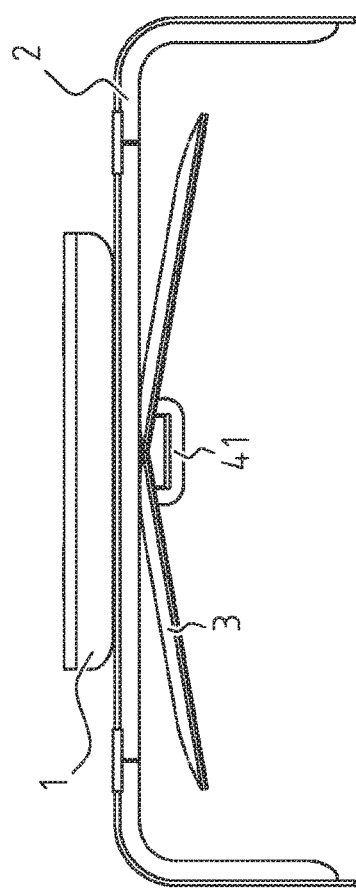
FIG. 6A is a top view of the system of FIG. 1.
Figure 6B:
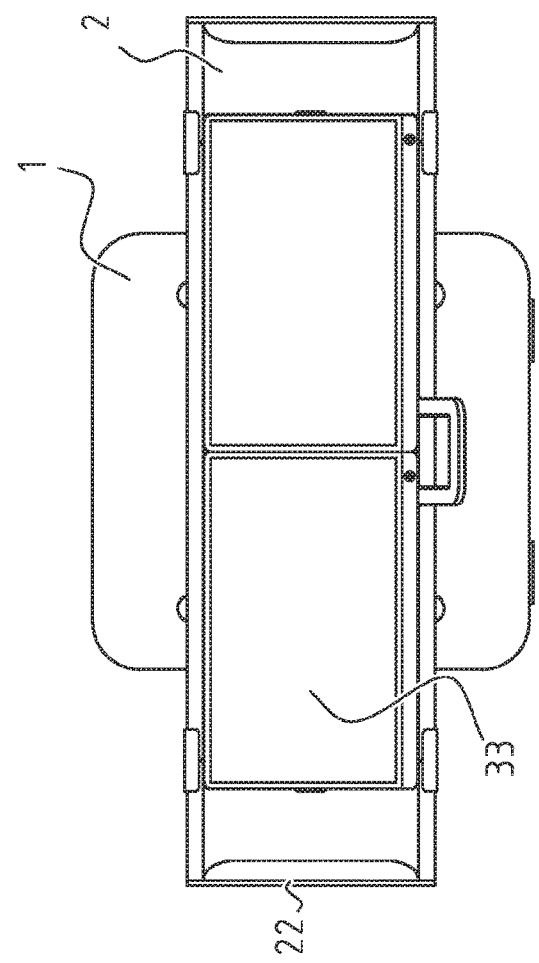
FIG. 6B is a front view of the system of FIG. 1.
Figure 7:
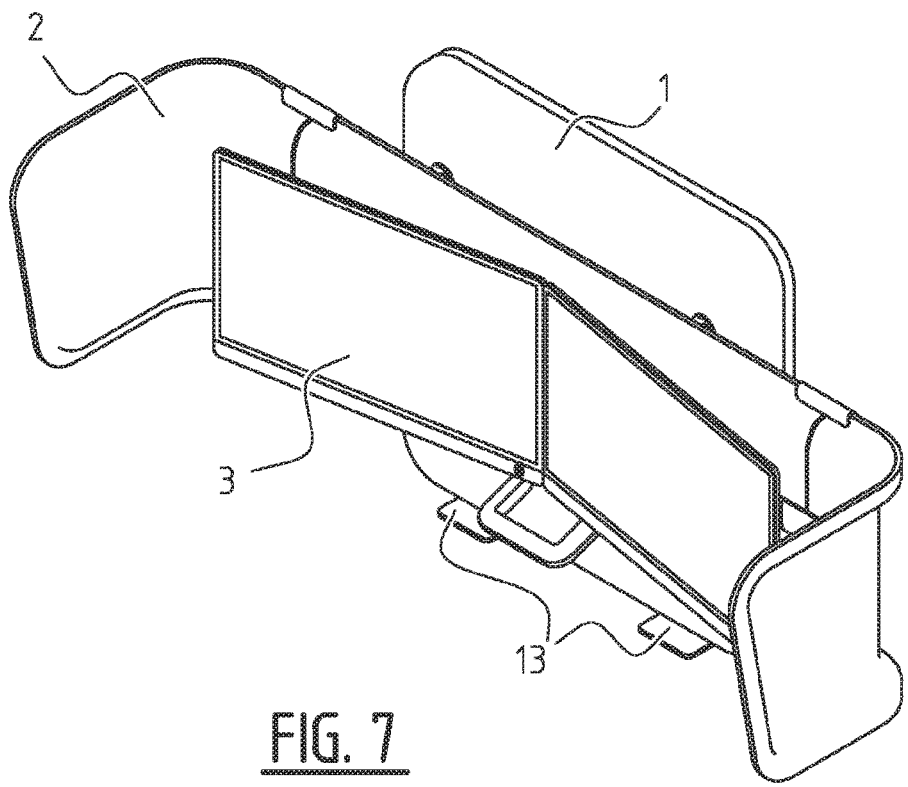
FIG. 7 is a perspective view of the first embodiment of the system, in accordance with FIG. 1.

With reference to FIGS. 1 to 7, an office workplace system, which can be placed on an office desk, comprises a vertically extending frame 1, a sound reducing and absorbing screen 2 (also known as a divider), and two computer monitors 3 extending adjacent to each other. In this example the computer displays 2 are mounted directly on the centre of screen 2 by means of standard well known computer display mounts (not shown), which allow for some rotational and depth adjustment of the displays 3 relative to the screen 2. The base of frame 1 is provided with two horizontally extending feet 13, which are arranged to rest on or to be mounted to the desk top.

The frame 1 comprises a front panel 11 and a back panel 12. The screen 2 with the displays 3 are adjustable in height by means of a height adjusting mechanism, comprising two mounting brackets 42 to which the screen 2 is mounted, said brackets being slidably mounted in two vertical slots 47 of the frame 1. The slots 47 are provided with a mounting profile 46 with linear slides 43 on each side thereof for guiding the mounting brackets 42. At the top of each slot 47 a housing 44 is attached inside the frame 1 to the mounting profile 46 in which a (constant force) spring 45 is mounted, the end of which is connected to the respective bracket 42. The force of the spring 45 is approximately equal to the weight of the screen 2, the two displays 3 and the display mounts. The frictional force between the brackets 42 and the slides 43 is enough to hold the screen 2 with the displays 3 in the desired height position. A grip 41 is mounted to the screen 2, such that a user can easily adjust the height of the screen 2 with the displays 3.

The screen 2 has a flat central part 21 and two lateral side wings 22, which extend perpendicular to the central part 21. The connecting parts between the side wings 22 and the central part 21 are curved. Also the upper and lower edges of screen 2 are curved towards the back side. The front surface of the screen 2 is formed by a sound insulating and sound absorbing padding, such as a 15 mm thick polyether foam, which is covered by fabric.

Figure 8:
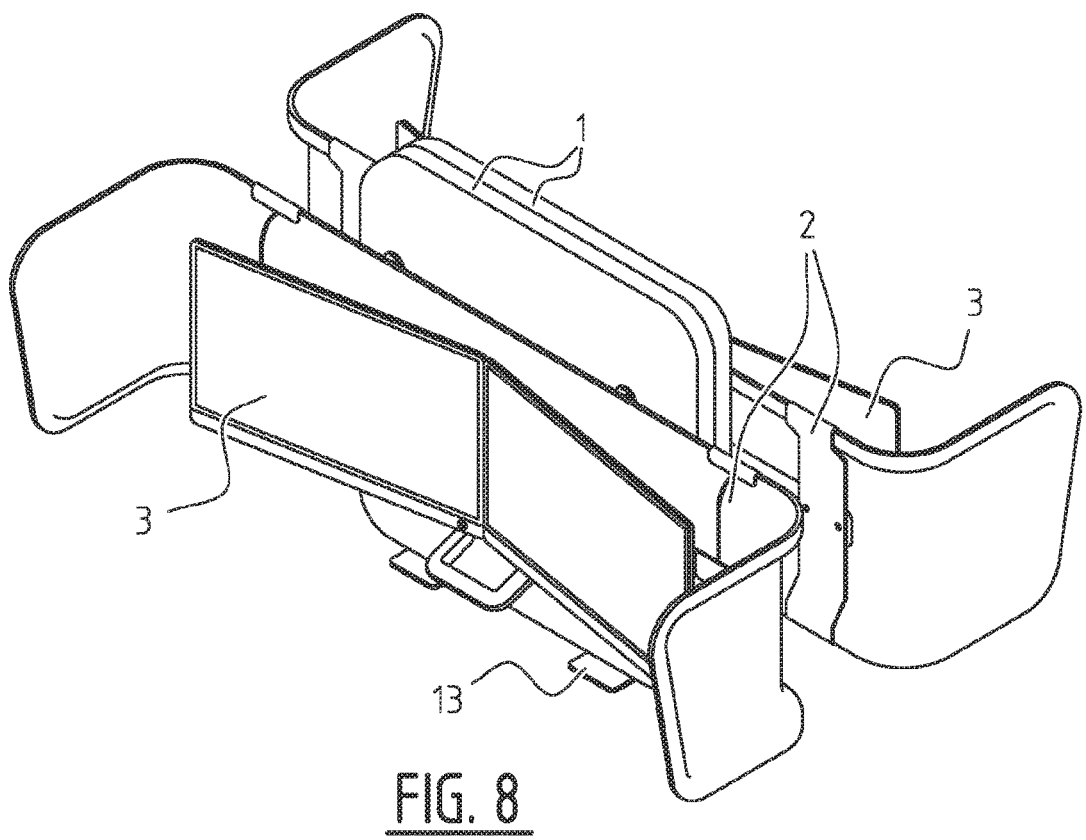
FIG. 8 is a perspective view of a second (face-to-face) embodiment of a system in accordance with the invention.

FIG. 8 shows a face-to-face variant of the system, in which two screens 2, with each two computer displays 3, are mounted on opposite sides of a frame 1.

Figures 9, 10:
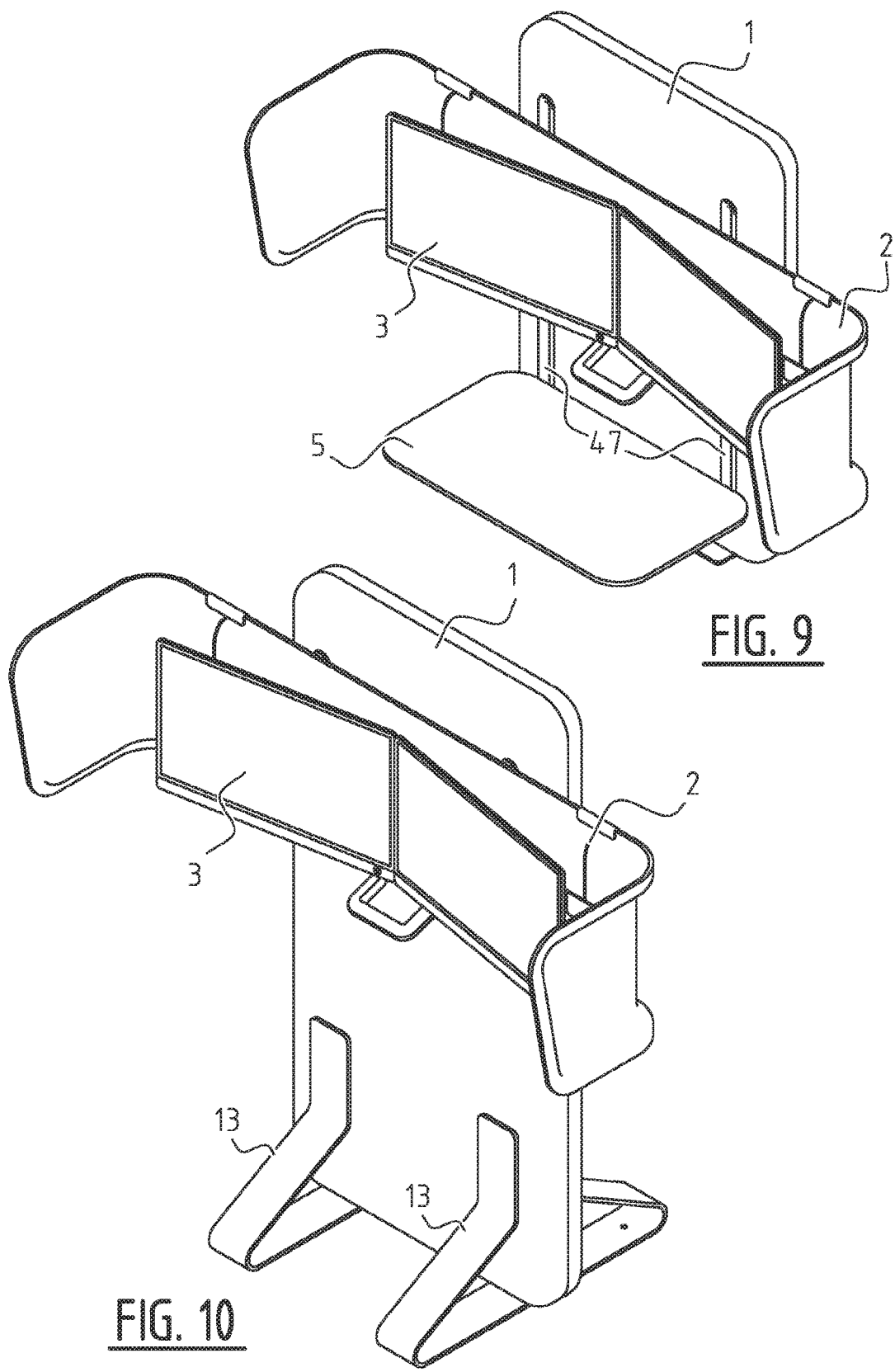
FIG. 9 is a perspective view of a third (sit/stand) embodiment of a system in accordance with the invention.
FIG. 10 is a perspective view of a fourth (floor stand) embodiment of a system in accordance with the invention.

FIG. 9 shows a sit/stand variant of the system, in which the frame 1 is substantially higher, and provided with slots 47 which are sufficiently long to allow a user to set the screen 2 and displays 3 at ear height either when sitting or standing, at his/her choice. A desk 5 is attached to the screen 2, for supporting a keyboard and mouse at the correct corresponding height.

FIG. 10 shows a floor standing variant, wherein the frame is sufficiently high to support the screen 2 and the displays 3 at the correct above a standard office desk.

Figure 11:
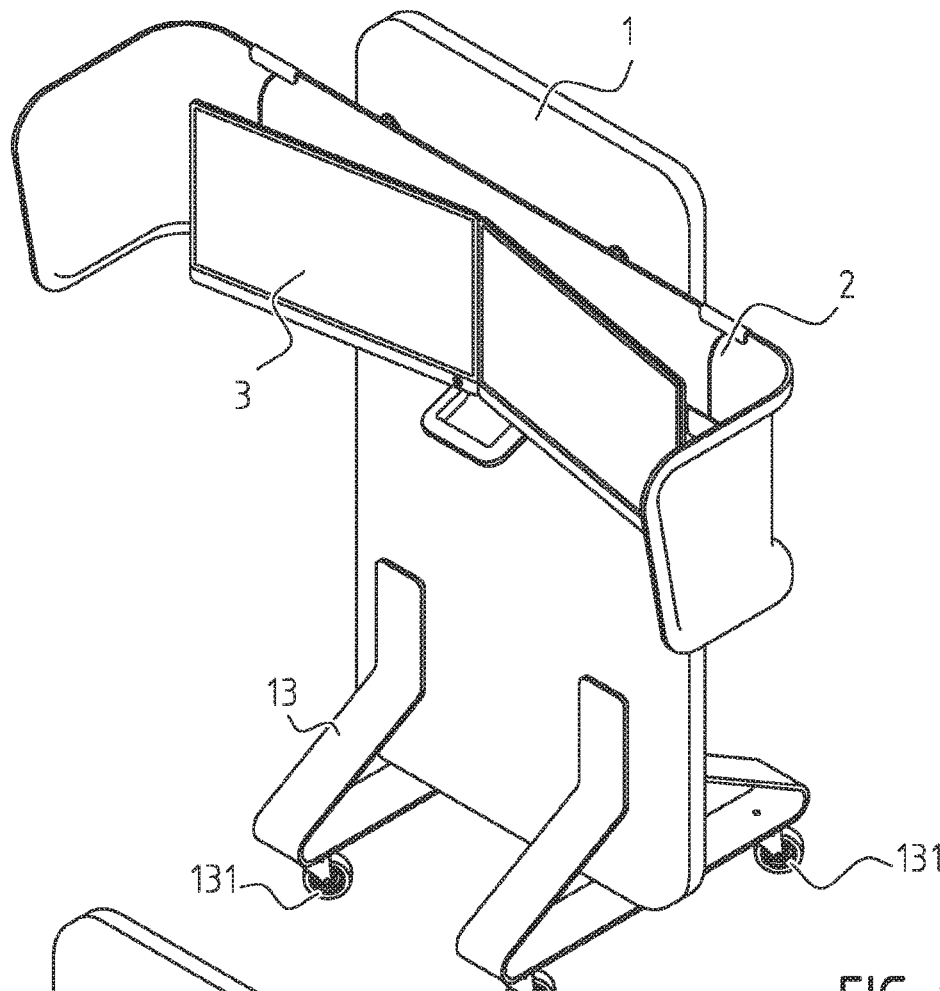
FIG. 11 is a perspective view of a fifth (mobile floor stand) embodiment of a system in accordance with the invention.

FIG. 11 shows a mobile variant of the floor standing variant, wherein the feet 13 at the base of the frame 1 are provided with caster wheels 131.

Figure 12:
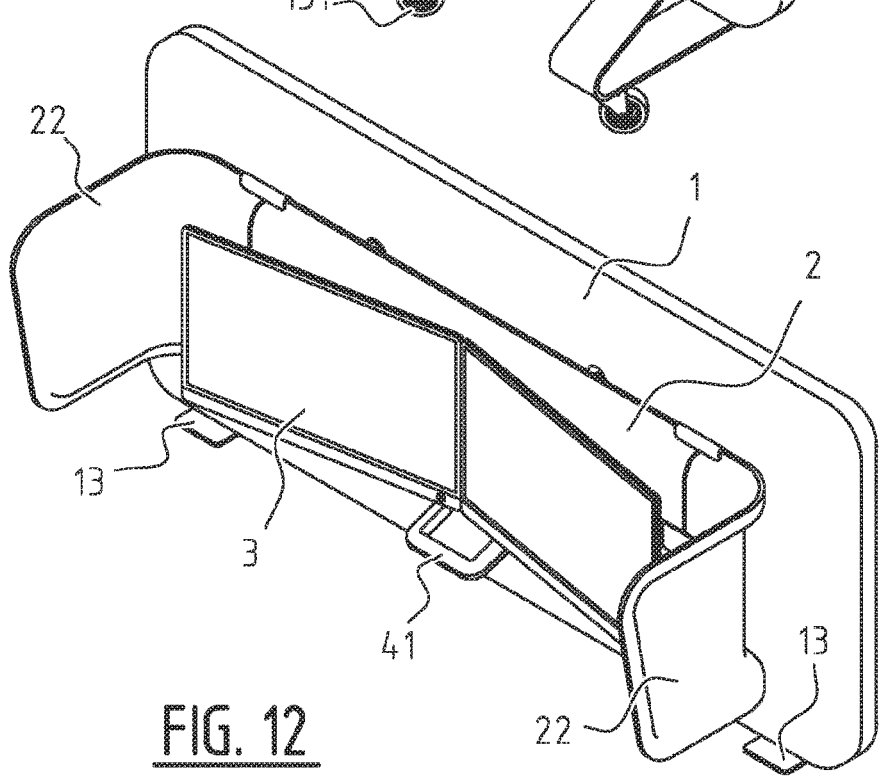
FIG. 12 is a perspective view of a sixth (wide) embodiment of a system in accordance with the invention.

FIG. 12 shows a variant wherein the vertical frame 1 is both higher and wider then the screen 2, thereby forming a dividing wall providing extra privacy and sound reduction for a user.

The invention has thus been described by means of preferred embodiments. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein.

The invention claimed is:

1. An office workplace system, for use with an office desk, the system comprising:
    a vertically extending frame with a base arranged to be placed on, or fixed to, a floor, a wall, a ceiling or a desktop;
    a sound reducing and/or absorbing screen, wherein the screen is elongated in shape, a front surface of the screen and short edges of the screen extend vertically and long edges of the screen extend horizontally, wherein the front surface of the screen is formed by at least one of a sound insulating and sound absorbing padding;
    wherein the frame is arranged to hold the screen at a height relative to the floor, the wall, the ceiling or the desktop;
    wherein the frame is provided with means to adjust a height of the screen relative to the base of the frame;
    wherein the system further comprises a computer display mount for holding at least one computer display;
    wherein the frame holds the display mount at a height relative to the floor, the wall, the ceiling or the desktop;
    wherein the frame is provided with means to adjust a height of the display mount relative to the base of the frame; and
    wherein the system is provided with means arranged to fix a relative height between the screen and the display mount while the height of the screen and the display is being adjusted.

2. The system according to claim 1, wherein said means arranged to fix a relative height between the screen and the display mount are arranged to fix the display mount at or against a centre of front surface of the screen, such that a centre of the display mount is always at the same height as the centre of the screen front surface.

3. The system according to claim 1, wherein said computer display mount is arranged to hold two computer displays horizontally next to each other.

4. The system according to claim 1, wherein vertical cross sections of a front surface of the screen are curved near upper and lower edges.

5. The system according to claim 1, wherein the system is dimensioned such that a height of a centre of the screen is adjustable to at least two different heights.

6. The system according to claim 1, wherein a distance between front surfaces of lateral side wings is between 100 and 140 cm.

7. The system according to claim 1, wherein a height of a front surface of the screen is between 30 cm and 60 cm.

8. The system according to claim 1, wherein said means to adjust the height of the screen relative to the base of the frame comprise a spring or a counterweight which exerts an upward force to the screen which is at least equal to a total weight of height adjustable parts of the system including the screen.

9. The system according to claim 1, wherein the system is dimensioned such that the lower edge of the screen extendable higher than 70 cm above the floor.

10. The system according to claim 1, wherein the base of the frame is arranged to be placed on, or fixed to, a desktop.

11. The system according to claim 1, wherein said screen has a central part which is substantially flat and two lateral side wings of which front surfaces face each other and extend approximately perpendicular to a front surface of the central part.

12. The system according to claim 1, wherein the frame comprises a vertically extending plate comprising at least one vertical slot in which the screen is slidably mounted.

13. The office workplace system according to claim 1, further comprising said office desk;
wherein the system is dimensioned such that a lower edge of the screen is extendible higher than a height of a top front surface of the office desk with which the system is used.

14. An office workplace system, for use with an office desk, the system comprising:
a vertically extending frame with a base arranged to be placed on, or fixed to, a floor, a wall, a ceiling or a desktop;
a sound reducing and/or absorbing screen, wherein the screen is elongated in shape, a front surface of the screen and short edges of the screen extend vertically and long edges of the screen extend horizontally, wherein the front surface of the screen is formed by at least one of a sound insulating and sound absorbing padding;
wherein the frame is arranged to hold the screen at a height relative to the floor, the wall, the ceiling or the desktop;
wherein the frame is provided with means to adjust a height of the screen relative to the base of the frame; and
wherein said screen has a central part which is substantially flat and two lateral side wings of which front surfaces face each other and extend approximately perpendicular to a front surface of the central part.

15. The system according to claim 14, wherein horizontal cross sections of a connecting front surface between the side wings and a central part are curved.

16. The system according to claim 14, wherein the frame comprises a vertically extending plate comprising at least one vertical slot in which the screen is slidably mounted.

17. The office workplace system according to claim 14, further comprising said office desk;
wherein the system is dimensioned such that a lower edge of the screen is extendible higher than a height of a top front surface of the office desk with which the system is used.

18. An office workplace system, for use with an office desk, the system comprising:
a vertically extending frame with a base arranged to be placed on, or fixed to, a floor, a wall, a ceiling or a desktop;
a sound reducing and/or absorbing screen, wherein the screen is elongated in shape, a front surface of the screen and short edges of the screen extend vertically and long edges of the screen extend horizontally, wherein the front surface of the screen is formed by at least one of a sound insulating and sound absorbing padding;
wherein the frame is arranged to hold the screen at a height relative to the floor, the wall, the ceiling or the desktop;
wherein the frame is provided with means to adjust a height of the screen relative to the base of the frame; and
wherein the frame comprises a vertically extending plate comprising at least one vertical slot in which the screen is slidably mounted.

19. The office workplace system according to claim 18, further comprising said office desk;
wherein the system is dimensioned such that a lower edge of the screen is extendible higher than a height of a top front surface of the office desk with which the system is used.

* * * * *